United States Patent [19]

Yoshida

[11] 4,056,193
[45] Nov. 1, 1977

[54] SHEET HOLDER ATTACHMENT ADAPTED TO BE USED WITH SHEET HOLDER FOR SHEET COUNTER

[75] Inventor: Minoru Yoshida, Tokyo, Japan

[73] Assignee: Laurel Bank Machine Co., Ltd., Tokyo, Japan

[21] Appl. No.: 670,843

[22] Filed: Mar. 26, 1976

[30] Foreign Application Priority Data

Mar. 28, 1975 Japan ................... 50-41722

[51] Int. Cl.² ............................................. B65H 5/08
[52] U.S. Cl. ...................................... 211/51; 24/67.7; 271/95; 271/171
[58] Field of Search ................... 211/51; 24/67.3, 67.7, 24/67.11; 271/95, 171

[56] References Cited
U.S. PATENT DOCUMENTS

| 462,123 | 10/1891 | Friede | 24/67.3 X |
| 724,320 | 3/1903 | McGregor | 24/67.7 X |
| 1,277,987 | 9/1918 | Miller | 211/51 |
| 1,645,151 | 10/1927 | Mathewson | 211/51 |
| 2,973,868 | 3/1961 | Poskin | 211/51 |
| 3,216,583 | 11/1965 | Vani | 211/51 |
| 3,326,388 | 6/1967 | Zidek | 211/51 |
| 3,795,796 | 3/1974 | Shigemori et al. | 271/95 X |
| 3,847,387 | 11/1974 | Sick | 271/171 |
| 3,953,022 | 4/1976 | Oshima | 271/95 |
| 3,976,292 | 8/1976 | Yoshida | 271/95 |

Primary Examiner—Roy D. Frazier
Assistant Examiner—Robert W. Gibson, Jr.
Attorney, Agent, or Firm—Harold L. Stowell

[57] ABSTRACT

A sheet holder attachment is used with a sheet holder for a counter for counting sheets and comprises a base member, a keep member pivotably mounted on said base member and spring means for urging said keep member toward said base member to hold a stack of small sheets to be counted on said base member. The base member has a stand portion for supporting the lower end of the sheet stack and abutment members adapted to engage the rear end of the sheet stack.

1 Claim, 3 Drawing Figures

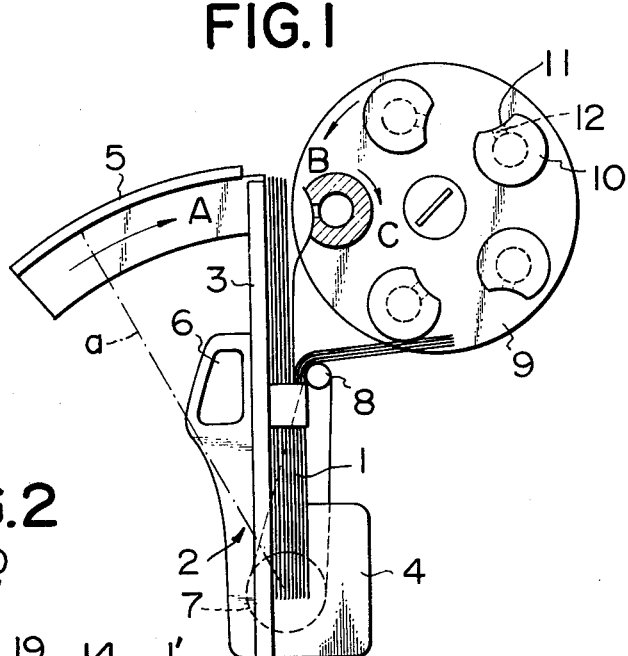
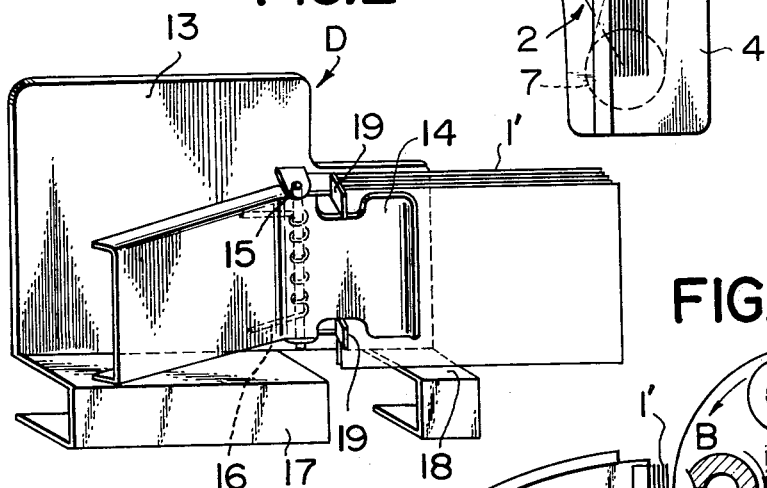
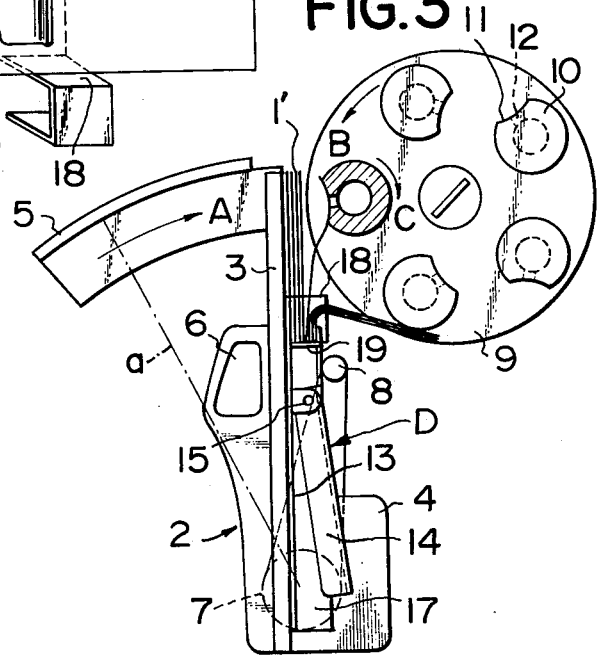

SHEET HOLDER ATTACHMENT ADAPTED TO BE USED WITH SHEET HOLDER FOR SHEET COUNTER

This invention relates to a sheet holder for a sheet counter for counting sheets such as bank notes and more particularly to a sheet holder attachment for holding special sheets smaller in size than the standard sheets, for instance tickets, receipts and coupons in a position that the sheet counter is capable of counting these small sheets.

The invention will be apparent from the following description made by referring to the accompanying drawings in which FIG. 1 is a plan view showing part of a conventional sheet counter, FIG. 2 is a perspective view showing a sheet holder attachment according to this invention, and FIG. 3 is a plan view showing the sheet holder attachment according to the invention mounted on the conventional sheet counter.

Sheet counters for counting sheets such as bank notes have been known and typically have a construction as shown in FIG. 1. In this type of counter, a holder 2 comprises a holding plate 3 and a sheet receiving plate 4 secured to the rear end of the holding plate 3 and is adapted to be moved about a pivot 7 from a position shown at a solid line in FIG. 1 to a position shown at a broken line a. The holder 2 is also spring loaded to move toward a sheet keep rod 8. When the holder 2 is in the position shown at the broken line a, a stack of sheets is loaded on the holder with its forward end and rear lower end positioned on a sheet arranging member 5 and a sheet receiving plate 4, respectively. Then, by closing a start switch 6 the holder 2 is rotated about the pivot pin 7 in the direction of arrow A, so that the sheet stack 1 is clamped between the holding plate 3 of the holder 2 and the sheet keep rod 8. Then, a vacuum pump not shown is operated, while simultaneously causing the rotation of a rotative cylinder 9 in the direction of arrow. The rotative cylinder 9 carries a plurality of circumferentially spaced suction shafts 10, each of which is rotated about its own axis in the direction of arrow C concurrently with its revolution in the direction of B. As counting proceeds, each one after another of sheets in the sheet stack is attracted through a suction mouth 12 formed on a suction face 11 of each suction shaft 10 onto the suction face 11, and after rotation and revolution of the suction shaft 10 predetermined extents, the attracted sheet is released from suction and inserted between this suction shaft and the next suction shaft and eventually held as a member of the counted sheet group.

In this type of sheet counter, the dimensions of the sheet arranging member 5, the holder 2, the sheet keep rod 8 and suction shafts 10 are determined to conform to the size of standard sheets such as bank notes to be counted in order to facilitate counting and prevent miscounting. Therefore, with this counter, it is often impossible to count special sheets different in size and sheet material from the regular bank note or the like, for instance tickets, receipts, coupons, etc., because of too small length of sheets to be clamped by the sheet keep rod 8 and too small width of sheets to be suction attracted to the suction mouth 12. Also, even if counting different kinds of sheets with the above sheet counter is possible, the problem of miscounting or inaccurate counting is likely.

An object of this invention is to provide a sheet holder attachment which permits accurate counting of special sheets with the afore-mentioned sheet counter and without any modification thereof.

Referring to FIG. 2 of the drawings, a sheet holder attachment of this invention is indicated at D and comprises a base member 13 and a sheet keep member 14 pivotably mounted at 15 on the base member 13, these members being held in a sheet clampling relation to each other by the restoring force of a torsion spring 16 wound on the support pin 15. The base member 13 is formed with a pair of spaced stand portions 17, one of which serves to place the base member 13 on the sheet receiving plate 4. The other stand portion has an upper surface 18 which serves to receive the lower end of a stack of special sheets 1' of small dimention to be counted in order to position the sheets 1' in an optimum position for suction attraction by the suction mouth 12. The base member 13 is also provided with abutment members 19 which protrude outwardly from the base member 13 at a right angle to a plane of the base member. The abutment members 19 serve to aling the rear ends of the sheets 1' for facilitating their clamping. Because of the flat back surface of the base member 13, it can abut on the surface of the holding plate 3 of the holder 2.

As shown in FIG. 2, the sheet stack 1' is loaded in the sheet holder attachment D such that it is clamped between the base member 13 and sheet keep member 14 with the lower end of the sheets 1' placed on the stand surface 18 and the rear end of the sheets aligned by the abutment members 19. When the sheet holder 2 is in the position as indicated at a' the sheet holder attachment D carrying the sheet stack is mounted on the sheet counter, as shown in FIG. 3, with the back surface of the base member 13 positioned in engagement with the back plate 3 of the holder 2, with the stand 17 positioned on the sheet receiving plate 4 and with the forward end of the sheet stack 1' held in engagement with the sheet arranging member 5. Then, by closing the start switch 6 the holder 2 is rotated toward the rotative cylinder 9 in the direction of arrow A until the sheet keep member 14 has abutted on the rod 8. Thus, the special sheets 1' are held at the optimum counting position with respect to the suction mouth 12 so that the counter is capable of counting the special sheets in the same manner as in the regular bank notes.

It will be noted from the foregoing that the use of the sheet holder attachment according to the invention makes it possible for the conventional sheet counter for counting bank notes to count special sheets, thus increasing utility value of the sheet counter.

I claim:

1. In combination with a sheet holder for a sheet counter for counting sheets by suction attracting them one by one, a small sheet holder attachment, said sheet holder including a sheet receiving plate, a sheet holding plate attached thereto, a counted sheet keeper rod, means pivotally mounting the sheet holding plate and the sheet receiving plate for movement toward the sheet keeper rod to a sheet counting position, said small sheet holder attachment characterized by: a base member, means mounting said base member to the sheet holding plate of the sheet holder for movement with the sheet holding plate toward the keeper rod, a keep member pivotably mounted on said base member and spring means for urging said keep member toward said base member to clamp a stack of small sheets to be counted between said base member and said keep member, said base member having a stand portion for supporting the lower end of the sheet stack, and abutment members adapted to engage the rear end of the sheet stack.

* * * * *